MASS PRODUCTION OF ELECTRONIC DEVICES

Filed Feb. 3, 1967 4 Sheets-Sheet 1

INVENTORS
NORMAN G. AINSLIE
DEVENDRA S. CHHABRA
DONALD W. JEPSEN
WALTER E. MUTTER

BY Alvin J. Riddles
ATTORNEY 3,474,530

MASS PRODUCTION OF ELECTRONIC DEVICES

Norman G. Ainslie and Devendra S. Chhabra, Poughkeepsie, Donald W. Jepsen, Tarrytown, and Walter E. Mutter, Poughkeepsie, N.Y., assignors to International Business Machines Corporation, Armonk, N.Y., a corporation of New York Filed Feb. 3, 1967, Ser. No. 613,947
Int. Cl. H01b *13/00;* H05k *3/00*
U.S. Cl. 29—624 7 Claims

ABSTRACT OF THE DISCLOSURE

Mass produced devices affected by physical changes that require a long time to exert their influence may be accurately fabricated by a combined empirical and physical fabrication approach.

When currents carried by conductors reach a magnitude in excess of 100 times present design practice such that the electron flow results in physical movement of the atoms of the conductor, the life of the conductor is a given period of time. The invention sets forth a process of fabricating an electrical conductor so that its lifetime is a desirable value. The factors rendering the lifetime controllable are the fact that the lifetime varies inversely as a low power of the current density but only up to 25% of the maximum tolerable current the conductor can carry, and the fact that an activation energy may be specified that reflects the conductor material and its physical condition. The lifetime to a first approximation is proportional to the product of the reciprocal of the current density raised to a power between 1 and 3, depending upon the constraints of use, and to an exponential factor containing an activation energy at least greater than .3 electron volts. Conductors with lifetimes far in excess of the time available for real tests may be constructed by establishing materials and dimensions through accelerated tests which identify specific values peculiar to the individual conductor in situ and then using the measured values to further evaluate performance in the general lifetime relationship.

CROSS REFERENCES TO RELATED APPLICATIONS

Application Ser. No. 539,210, filed March 31, 1966, and assigned to the assignee of this invention, is indicative of the type of integrated circuitry apparatus to which this invention has been found to be useful at the present state of the art. It is illustrative of the constraints placed upon conductors in this environment and it is illustrative of the type of products wherein long duration phenomena may play a decisive role.

BACKGROUND OF INVENTION

Field of the invention

The invention is in the field of mass produced items that are beyond normal manual dexterity to fabricate whose performance is affected by a long term physical phenomenon which in turn requires so long to maturity that time for actual testing is not available. As an example of the magnitude of the problem, the items involved may be manufactured at rates of many thousands per day for an expected life of several decades and only after the elapse of a decade does it become apparent that a very slowly moving physical phenomenon is going to radically change performance from that which was desired. It will be apparent that it will be vital in this field that an approach be established that will permit a short duration accurate evalution of the effect of performance of the long term phenomenon and a method of building the items to the desired performance.

The invention will be described in terms of its application to the integrated electronic circuitry field and to the effect of atomic transport on electrical conductors in these circuits.

A conductor, previously viewed as having an infinite period of usefulness, is now known to wear out in a manner analogous to the wear-out of other mechanical or electrical objects. The phenomenon is caused by a unidirectional electron flow sweeping the atoms or ions of the conductor. This phenomenon has been known in the art by a variety of names, the more accepted being those of "current-induced mass transport" or "electromigration."

At the present state of the art copper conductors are designed for current densities of up to about 1000 amp/cm.$^2$. For example, a 12 gauge aluminum wire in air would carry about 15 amperes which would be a current density of about 700 amp/cm.$^2$. This increases its temperature about 5° C. In contrast to this, under stringent design constraints, the current density in an integrated semiconductor circuit, even though the total current is in the milli-ampere range, may approach one million amp/cm.$^2$. A conductor under these conditions is only a few thousandths of an inch long and is tightly bonded to a temperature conducting member. Its temperature rise is then only fractions of a degree, but as will be established in accordance with the invention, this can cause substantial damage.

Conductors under heavy current flow such as in this environment have an electron flow so great that temperature rises in the conductor, due to imperfections or loss of material, rapidly operate to cause an acceleration in movement of material from one place to another. The movement in turn causes a depleted region of conductor volume which causes the process to accelerate and failure by open circuit then occurs rapidly.

A slowly progressing wearing out phenomenon in a mass produced item is involved and it will be apparent that actual duration tests of lifetime will far exceed the time available. Lifetimes in devices may be desirable as long as 100,000 hours or eight hours a day for 30 years. Actual tests of this duration are wholly impractical. Accelerated tests have limitations introduced by the aggravated conditions that result from the acceleration. Since the production may be underway for as long as a decade before a real understanding of lifetime is realized, it is essential to establish an accurate lifetime forecast.

Description of the prior art

The phenomenon of mass transport of atoms in an electrical conductor due to collisions with electrons under heavy current flow has been observed experimentally and reported in the art with respect to the physical movement of marks on wires, and the following references represent the most closely related literature in the field that applicant has been able to uncover:

(1) R. V. Penny. Journal of Physical Chemistry and Solids, Pergamon Press 1964, vol. 25, pp. 335–345. Printed in Great Britain.

(2) H. B. Huntington and A. R. Grone, Journal of Physical Chemistry and Solids, vol. 20, pp. 76–87, 1961.

The phenomenon of atomic movement has been described in a number of texts of which the following is an example:

(1) Atom Movement. American Society for Metals, Cleveland, Ohio (1951).

The problem of failure of electronic equipment has been addressed in the following references:

(1) A. Blech and H. Sello (Fairchild Semiconductor), "The Failure of Thin Aluminum Current-Carrying Strips on Oxidized Silicon," Fifth Annual Symposium held November 1966, Battelle Auditorium, Columbus, Ohio.

(2) Dr. J. A. Cunningham and J. G. Harper. The Electronic Engineer, January 1967, pp. 74–79.

(3) George L. Schnable and Ralph S. Keen (Philco Corp.) "Study of Contact Failures in Semiconductor Devices," Technical Report No. RADC–TR–66–165, April 1966, or Defense Documentation Center, Alexandria, Va., Report AD 483847.

(4) H. Sello, I. A. Blech, A. S. Grove et al. (Fairchild Semiconductor), "A Study of Failure Mechanisms in Silicon Planar Epitaxial Transistors," Technical Report No. RADC–TR–66–36, May 1966, or Defense Documentation Center, Alexandria, Va., Report AD 487527.

This invention relates to the prior art in that it provides a fabrication approach which will enable one skilled in the art to translate the various previously unrelated increments of experimental intellectual progress involving this phenomenon into manufacturing criteria for an actual physical structure.

SUMMARY

It has been found that the lifetime of a conductor subjected to a heavy current flow sufficient that actual transport of atoms takes place is specificable as the product of a power of the reciprocal of the current density and an exponential term whose argument contains the activation energy of the conductor material in the following approximate relationship:

EQUATION 1

$$\text{Lifetime } \alpha J^{-p} \exp [\Delta H/kT]$$

where $p$ is less than 3 and greater than 1 in a restricted useful range of current densities.

It has been further found, in accordance with the invention, that the useful range is only the range where J is 25% of the maximum tolerable current density determined by factors other than electromigration phenomena as will be later described. The lifetime varies as $J^{-1}$ to $J^{-3}$ according to the several factors influencing current-induced mass transport of which current density is a major item, as will be later described. The activation energy ΔH in Equation 1 is that appropriate to the diffusion coefficient of the dominant diffusion mode. At ordinary service temperatures, for example ±200° C. from room temperature, grain boundary or surface self-diffusion predominates. The activation energy ΔH for aluminum, for example, is equal to 0.3 to 0.6 electron volts whereas for copper the activation energy is from 0.8 to 1.2 electron volts. In general, the higher the melting point of the conductor the higher will be the activation energy. Another factor affecting ΔH is the volumetric structure of the conducting material. $k$T in Equation 1 is the product of Boltzmann's constant and the absolute temperature of the conductor during operation. It has been found that there is a different lifetime for each point along the conductor's length and thus, the lifetime of the conductor is that for the point on the conductor having the shortest lifetime.

Where a discontinuity of conductor material occurs, such as at a solder joint, or thermal compression bond, the lifetime is governed by the first power of the current density. In other words, in accordance with the invention, the lifetime is directly and linearly related to the first power of the reciprocal of the current density. Where a discontinuity of metallurgical structure occurs, for example, at the boundary between a large grained region, the lifetime is again governed by the reciprocal of the first power of the current density.

In a temperature gradient, however, the lifetime is determined by the reciprocal of the third power of the current density up to a practical current density maximum.

Beyond this practical current density maximum, the current density dependence increases rapidly.

In other words, in accordance with the invention, lifetime decreases with increased current density, and it varies inversely as a power between 1 and 3 of the current density. In accordance with this invention, there is established a practical limit to the current density and that limit is about 25% of the maximum tolerable current density to be later defined. In the region beyond 25% of, and the maximum tolerable current density, the devices will have very short lifetimes and will be useful only in special apparatus. In the material aluminum, for example, the relationship is valid to about 2 million amp/cm.$^2$, and the maximum tolerable density is about 10 million amp/cm.$^2$.

At a given current density J, the temperature dependence of the lifetime is determined principally by the exponential factor exp $[\Delta H/kT]$. ΔH in the factor will, in general, depend upon the particular base metal, whether or not the conductor is a pure metal or an alloy, and the structural characteristics of the conductor. For example, whether it has coarse or fine grain size, or whether it has grain boundary or lattice dispersions of precipitate particles, its state of strain, the density of the imperfection therein, and the ratios of free surface to grain boundary surface to volume. ΔH then may be described as the self-diffusion activation energy of the particular material in situ ready for use. Self-diffusion coefficients are difficult to measure. In accordance with the invention, it has been found that one way to get an activation energy correlatable with the self-diffusion coefficient activation energy is to establish the temperature dependence of the lifetime of actual samples. This relationship provides an activation energy of the particular material in situ in the particular design configuration.

It has been found, in accordance with the invention, that acceptable lifetimes may be acquired by confining the self-diffusion activation energy to a value greater than 0.3 electron volts. Where the conductor is made of a complex alloy, or is subjected to a variety of processing operations affecting purity and grain size, in accordance with the invention, the self-diffusion activation energy can be established by taking sample measurements of lifetime of a typical conductor under essentially duplicate conditions at two or more temperatures.

The limitation of the self-diffusion activation energy to a value not less than 0.3 electron volts appears in two ways. It is a measure of the rate of transport and it also permits a high degree of acceleration for a given temperature increase. This latter is because the exponential relationship between lifetime and temperature is a steeper function for higher activation energies and hence it is possible to get more rapidly an illustration of ultimate lifetime behavior under service conditions. In establishing criteria for accelerated tests there are limits placed on temperature increases by the onset of unrelated phenomena.

In the field of integrated semiconductors, physical sizes are seldom much more than a few thousandths of an inch, far smaller than manual dexterity can usually handle. Most integrated circuit conductors are fabricated by a vapor deposition wherein a vapor of the conductor material, usually a metal, is condensed on the appropriate semiconductor structure. Either blanket vapor deposition followed by a subtractive etching process, or deposition through a mask, determines very precisely the form, dimensions, and location of the conductor. There are very many variables in this process such as, for example, the deposition container temperature, the vapor pressure within the container, and the substrate temperature. Further, subsequent processing operations such as heat cycling can change physical volumetric characteristics of the deposited conductor. In practice, however, the fabrication is done in a batch process so that it is possible to perform sample tests under identical conditions, and then use the information for unlimited subsequent production.

It has been found, in accordance with the invention, that factors correlatable with the self-diffusion activation energy of a particular conductor may be established by measurement of the volumetric properties such as resistivity, the ratio of resistivities at widely separated temperatures, the superconductive transition temperature, or the initial stress state of the conductor.

This invention sets forth a process of assessing on a short term basis the effect of a long term phenomenon and provides a process of fabricating a conductor to bring its lifetime compatible with the usefulness period of the apparatus of which the device using the conductor is to become a part.

It is an object of the invention to provide a method of fabrication of an item subject to a phenomenon requiring too long for actual test.

It is an object of the invention to provide a heavy current carrying conductor with a definite period of usefulness.

It is a further object of the invention to provide an accurate forecast of the period of usefulness of a conductor when the time involved is in excess of that available for an actual test.

DESCRIPTION OF THE PREFERRED EMBODIMENTS

The phenomenon to which this invention is directed has been found to be a serious hampering limitation in the construction of tightly packed integrated semiconductor apparatus, and where the performance constraints are sufficiently stringent in the apparatus, failure to be able to control this phenomenon may operate to make the functional purpose of the apparatus inaccessible. Because traditionally the mechanism of metallic conduction in semi-conductor device interconnections was considered either not to involve mass transport and concomitant material depletion, or the effect proceeded so slowly at standard current density designs, these metallic conductors were thought to have virtually infinite lifetime. There is some mass transport of atoms at all current values but the effect only becomes a serious limitation at current values greater than 100,000 amp/cm.$^2$. The phenomenon of current-induced mass transport of atoms, as the current carrying requirements of these conductors become greater than 100,000 amp/cm.$^2$, indicates that we now have a limitation on the life of the device by the fact that the current carrying conductors literally wear out. What is being set forth here are the criteria for the construction of the conductor so that the period of service, until wearout, can be maximized within the constraints of use. The conductor lifetime can thus be related to the lifetime of the apparatus in which the semiconductor device will be incorporated. Further, accurate lifetime forecasts may be made for devices where actual tests are impractical.

Figure 1:
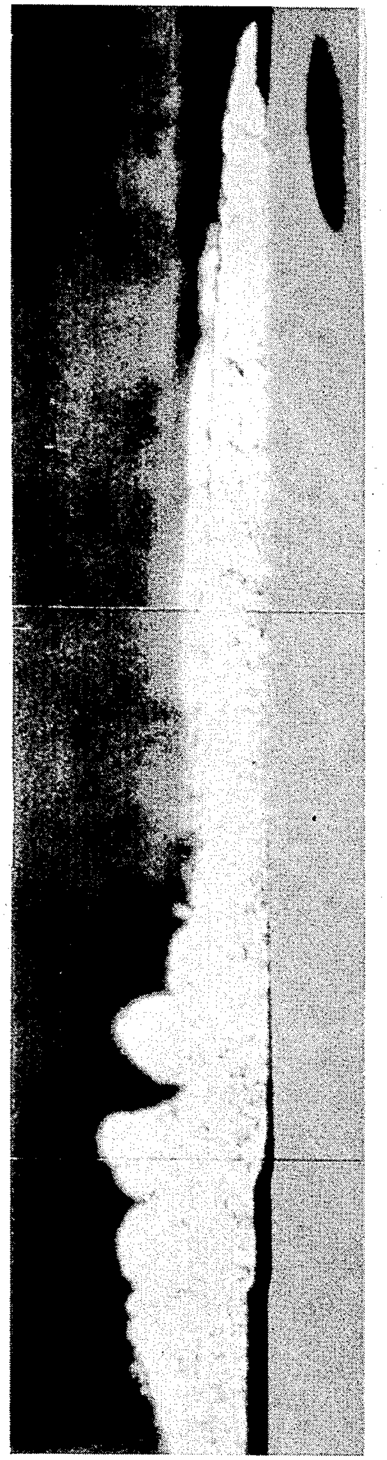
FIG. 1 is a photomicrograph of an aluminum conductor magnified 1000 times showing the regions of depletion and regions of addition resulting from the transport of material as a result of carrying a large current.

Referring to FIG. 1, with a heavy flow of current, in excess of 100,000 amp/cm.$^2$, with a normal figure being around one million amp/cm.$^2$, under the electron flow of the heavy current the atoms that make up the conductor are actually physically moved from region 1 of the conductor and pile up at region 2 where there results the apparent lumpiness and general thickening of the conductor. The changes of conductor shape may do damage to the device by shorting against other closely adjacent conductors or by breaking encapsulant coatings of protective material. The greatest concern is that the depleted region 1 now experiences a higher current density which operates to accelerate the depletion process in a manner akin to a chain reaction such that failure by open circuit rapidly occurs.

Figure 2:
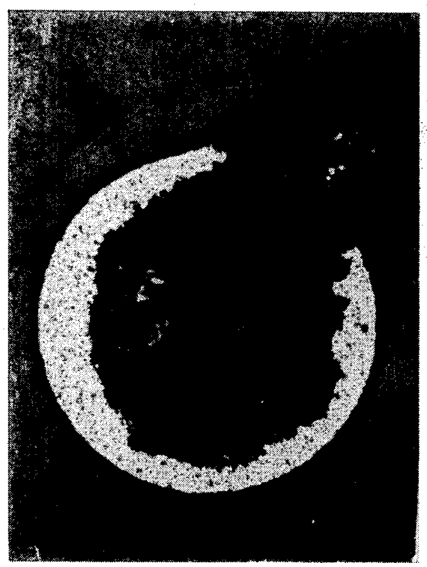
FIG. 2 is a photomicrograph of an aluminum conductor magnified 1000 times showing the effect of depletion of conductor material at the interface between two types of conductor materials.

In order to assist one skilled in the art in seeing the manifestations of the effect of mass atomic transport in devices, further photomicrographs are provided in FIGS. 2, 3, 4A and 4B which show the three principal types of locations where the mass transport effect causes failure. The first of these is in FIG. 2, showing the effect of the depletion of material during current flow where there is, adjacent to the depletion point, a different conducting material. As current flows, material on one side of the interface separating the two conductor segments moves away from the interface while material on the other side of the interface cannot, because of a lower diffusion coefficient (i.e. larger $\Delta H$ principally), move in rapidly enough to replace the loss. This type of failure is quite common. It frequently occurs adjacent to terminals and, in accordance with the invention, the terminal life-time has been found to be proportional to the first power of the reciprocal of the current density.

In FIG. 2, the conductor is made up of a conductor material 3 and, under the influence of heavy current as may be seen, only the circular contact rim remains of the original material, the remainder having been transported away.

Figure 3:
FIG. 3 is a photomicrograph of an aluminum conductor magnified 1000 times showing depletion of material at the point where failure or open circuit has occurred.

Referring next to FIG. 3, an example of a failure in the conductor proper is shown. It appears in the illustration as a crack 4. The crack 4 begins at a singularity in the conductor, usually at one of the grain boundaries, or at unintentional imperfections such as scratches, constrictions, or microstructural defects such as precipitate particles and non-uniform grain structure. Oftentimes such cracks form in regions in which a temperature gradient exists. Upon crack initiation there results a reduction of cross sectional area which causes both a hot spot and a higher current density. In turn there results a more rapid atom transport from that point. Failure occurs when the crack 4 progresses across the entire width of the conductor. It has been found, in accordance with the invention, that failures of the type shown in FIG. 3 are highly sensitive to the current density, that the lifetime at low currents depends upon the reciprocal of the current density raised to a power lying between 1 and 3. Beyond a certain limiting value which is only 25% of the maximum tolerable current the exponent rapidly increases. It has been found that satisfactory conduction lifetimes in aluminum conductors, for example, may be accurately projected using the first to third power dependence upon current density up to a limiting current density in the vicinity of two million amp/cm.$^2$ beyond which sensitivity to current is so great that the device has usefulness only in very short lifetime applications.

Figure 4A:
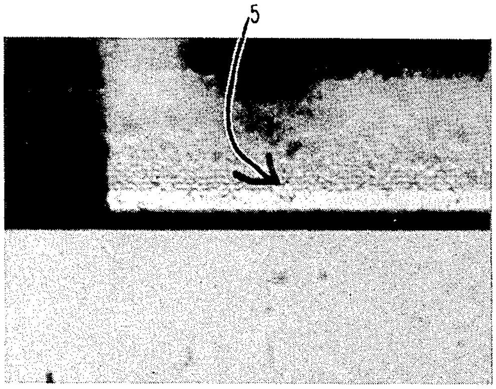
FIGS. 4A and 4B are photomicrographs of the same aluminum conductor magnified approximately 1500 times and 2000 times, respectively, showing the result of an imperfection below the surface of the current conducting member.
Figure 4B:
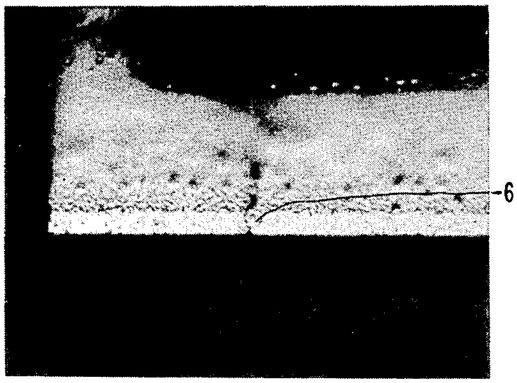
Figure 5B:
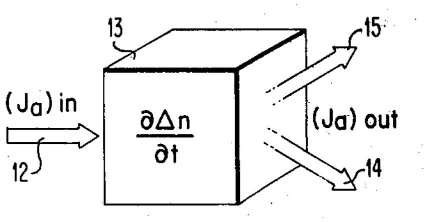

Referring next to FIGS. 4A and 4B, the effect of a processing variation is shown. In FIG. 4A, a notch 5 is seen progressing from the top or bonded surface of the conductor. Examination of FIG. 4B reveals that after application of current, a crack 6 has formed at the original notch in FIG. 4A. Such current constricting defects as the notch shown in FIGS. 4A and 4B cause higher local current densities, and hence shorter lifetimes. Processing imperfections in the fabrication of conductors are very difficult to detect and their effect on lifetimes have been most erratic. When it is appreciated that the conductors may be as thin as 25 angstroms, and very minor variations in substrate surface planarity can result in the notch 4 being already present, it will be apparent that failures will be difficult to control and predict. In accordance with the invention, this problem is handled by incorporating into the fabrication criteria a requirement of the quality of the conductor and its relationship in combination with current density on lifetime. This quality consideration is included in the conductor self-diffusion coefficient. The factor is really made up of the self-diffusion coefficient of the material in its pure state modified by factors which reflect the grain size, impurity concentration, surface condition, and other atom migration barrier-producing factors such as size and location of precipitate particles. It has been found in accordance with the invention, that a conductor may be evaluated as to its particular self-diffusion coefficient by any test capable of illustrating atomic migration rate. Examples are the resistivity, the ratio of resistivity measurements made at widely separated temperatures, the superconductivity transition temperature, the opaqueness to radiation, and the initial stress state of the conductor, as previously mentioned.

The conductors shown in FIGS. 1, 2, 3, 4A and 4B, as illustrations of the problem to which the invention is directed, are of the type that have been fabricated by deposition techniques wherein the material of the conductor is transported in a vapor state and then the individual atoms, or atom clusters of the vapor are caused to condense at a particular site where the conductor will be used. In this process the cross sectional area of the conductor and its length are governed by a subtractive etching process, or by a shape-defining mask positioned on a substrate. It will be apparent, however, that the physical principles set forth, in accordance with this invention, will be applicable to ordinary conductors fabricated using the ductility properties of the conductor material, and evidence of this is seen from the prior art tests on wires. In addition, the principles are applicable to monocrystalline conductors.

Where many objects are to be made, the size of the object and the rate of progress of the influencing phenomena result in having to employ indirect measurements and statistical distributions to establish accurate future performance. The following description sets forth the approach to evaluation of a physical phenomenon and the translation of the relationship based on the evaluation to actual performance and fabrication employing the electromigration phenomenon in conductors as an illustration.

In order to permit one skilled in the art in appreciating the physical principles set forth, in accordance with the invention, and to translate those principles into useful conductors, the material of FIGS. 5A, 5B, 6A, 6B, 6C, 7A, 7B and 7C are provided as sketches to illustrate graphically the effects pointed out in FIGS. 1, 2, 3, 4A and 4B, their interrelationship in influencing lifetime and how accurate lifetimes can be predicted.

Figure 5A:
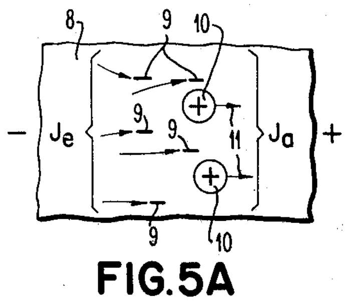
FIGS. 5A and 5B give an illustration of a change of atom flux in a heavy current carrying member.

Referring to FIG. 5A, under the phenomenon of current-induced mass transport, the atoms of a metal under the influence of heavy current flow are moved by collisions of electrons with the metal atoms or ions. This may be seen graphically in that the conductor 8 has an electron flux, i.e. current density, labelled $J_e$ and an atom flux labelled $J_a$. The electrons 9 collide with the metallic atoms or ions 10 and urge them in the direction of arrows 11. It has been observed in the prior art that there exists a physical mechanism effective at high temperatures that urge atoms in the opposite direction. In accordance with the invention, that mechanism has been determined to be ineffective at integrated circuit temperatures.

It will be apparent that at any one point in the conductor then, atoms are being transported out and in constantly, and should any point in the conductor operate to cause either a greater or lesser transport in or out, there will be a physical gain or loss of material at that point. This may be seen in FIG. 5B wherein an arrow 12, representing the atom flux "in" labelled $J_a$ reaches an individual site 13 shown schematically as a cube and two arrows 14 and 15 schematically illustrate an atomic flux "out" in excess of that "in." This condition may be referred to as a divergence of atom flux at that point. It is the number of atoms leaving in a given increment of time and is labelled in FIG. 5B as the differential $\partial(\Delta N)/\partial t$.

The result of a divergence of atom flux is an actual physical depletion of conductor material as discussed in FIGS. 1, 2, 3, 4A and 4B. The opposite of a divergence in connection with FIG. 5B would be a convergence wherein more atoms were delivered than transported away and would result in such things as the bumps 2 shown in FIG. 1. It is the atom divergence which is responsible for the greatest number of failures observed with this phenomenon to date. The divergence occurs as a result of either an abrupt, or a diffuse barrier present in the conductor which operates to cause more atoms to be transported out at a particular point than are transported in. The most direct of these may be seen in connection with FIGS. 6A, 6B and 6C wherein, in the case of 6A, a dissimilar material 16 is adjacent to a conductor 17, so that there is no adjacent equivalent atom source, and hence at the junction between the two materials, there is a depletion of material. As will be described in accordance with the invention, this is directly proportional to the reciprocal of the current density.

Figure 6A:
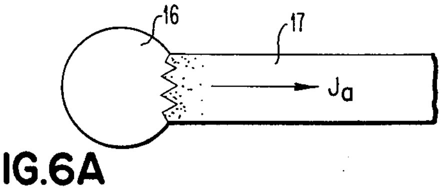
FIGS. 6A, 6B and 6C are partial views of FIGS. 2, 3, 4A and 4B, respectively, illustrating the material barriers present.
Figure 6B:
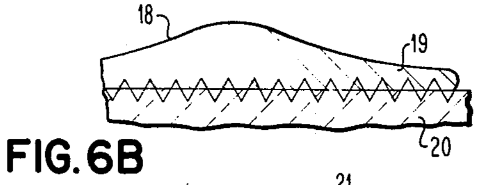

Referring next to FIG. 6B, a difference of cross sectional area is illustrated by the profile 18 of conductor 19 held by a bond shown schematically as a sawtooth line to a substrate 20 so that the current density would be much higher at the point of reduced cross section than that at the point of greater cross section. It will be apparent that this may occur both by a change of vertical and horizontal dimensions. Such current constrictions produce unusual temperature distributions that, coupled with the high current densities of the constricted regions, give rise to divergences of atom flux. A third type of divergence comes as a result of differences in grain size shown schematically in FIG. 6C. Since current flow takes place both through the grains as well as through the grain boundary material, and since in many situations atom flow occurs along preferred grain boundary routes, divergences of atom flux result when there are more grain boundaries to conduct material away from a region than there are to conduct material to the same region. Such a region exists at the interface separating two areas having each a different grain size, e.g. location 21 in FIG. 6C.

Figure 7A:
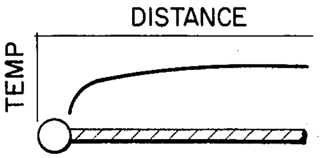
FIGS. 7A, 7B and 7C are graphs which illustrate the differences of thermal gradient produced by differences of conductor shape.
Figure 7B:
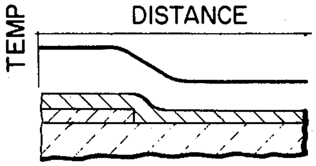
Figure 7C:
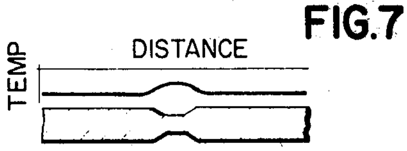

Referring to FIGS. 7A, 7B and 7C, the variation of temperature across a particular atom flux divergence producing point in a conductor is shown for the conditions where the conductor in 7A is adjacent to a terminal which acts as a heat sink, in 7B where the conductor goes down over a layer of insulation and contacts a substrate, and 7C where there is a reduction in cross sectional area.

In accordance with the invention, the thermal gradient produced in simple conductors varies approximately as the square of the current density providing the current density in any constricted region is less than a practical limit, which is 25% of a practical maximum tolerable current density, and in the case of aluminum integrated microminiaturized circuit conductors, is approximately $2\times10^6$ amp./cm.$^2$.

Another way to express the material discussed in connection with FIGS. 5A, 5B, 6A, 6B, 6C, 7A, 7B and 7C is that a failure will occur in a current carrying member when a point or site in the member is such that up the electron stream from that point or site the conductor is transparent to electrons but opaque to atoms, and down the electron stream relatively less opaque to atoms. This condition operates to cause a divergence of atom flux which divergence operates to reduce the material present at that point. The loss of material increases the seriousness of the divergence and the vicious circle thereby caused proceeds to failure of the conductor.

In order to enable one skilled in the art to apply and to translate the criteria set forth for control of atomic flux in the fabrication of a conductor, when faced with the many constraints in apparatus fabrication, the following mathematical derivations set forth in accordance with this invention are provided.

As an example of these constraints, due to the desirable high speeds expected, the capacitance connected with conductors must be minimized. Capacitance is radically increased with conductor width and decreases with conductor height. Similarly, conductor length is frequently fixed due to transmission line delays between active devices. Some of the constraints on thickness are that large temperature distributions may be encountered, and since etching takes place in most processing, undercutting of the conductor may be encountered. Where high conductors are employed, and a layer of insulation is deposited over the substrate and the conductor, the edges of the high conductor cause voids instead of a smooth deposit in the coating. Hence, it will be apparent to one skilled in the art that where serious limitations on cross sectional area dimensions are present, the only point of flexibility will lie in the self-diffusion coefficient of the material selected and the processing to which it is subjected. The manner of the interrelationship of the criteria of current density and self-diffusion coefficient may be seen as follows.

It has been established in the art that the atom flux involved in current-induced mass transport can be expressed by the relationship

EQUATION 2

$$J_a=\frac{NQ\rho}{kT}J_eD$$

where:

$J_a$ is the atom flux
N is the atom density of the atomic species being transported
Q is the effective charge of atom species being transported
$\rho$ is the specific resistivity of the conductor
$kT$ is the product of Boltzmann's constant and the absolute temperature
$J_e$ is the electron flux or current density and D is the appropriate diffusion coefficient.

Examination of Equation 2 reveals that the atom flux $J_a$ is proportional to both the current density $J_e$ and the diffusion coefficient D. Since the diffusion coefficient is traditionally represented in the Arrhemius form given by

EQUATION 3

$$D=D_o\exp[-\Delta H/kT]$$

where:

$D_o$ is a structure-dependent and, in general, slightly temperature-dependent coefficient
$\Delta H$ is the activation energy of the dominant diffusion mode and $kT$ is the product of Boltzmann's constant and absolute temperature.

It follows that the atom flux $J_a$ is proportional to the product of current density $J_e$ and the exponential factor $\exp[-\Delta H/kT]$.

It will be apparent that the rate at which failure can occur in a conducting member will be the rate at which atoms leave any given region and, hence, is given by a mass continuity equation.

EQUATION 4

$$\frac{\partial N}{\partial t}=-\text{Div } J_a$$

where:

$\partial N/\partial t$ is the rate at which the local atom density changes and

Div $J_a$ is the divergence of atom flux which in one dimension given by $\partial J_a/\partial x$ Equation 4 states that if there is one value of flux entering a given region of the conductor and a larger value of flux leaving the same region, then a condition known as divergence of atom flux is occurring which causes a depletion of material in the region. This region of the conductor, then, will then be the site of a failure due to open circuit within a finite length of time since the conducting material is continually being removed from it.

Letting N in Equation 4 be given by

EQUATION 5

$$N=N_o-\Delta N$$

where:

N is the local atom density at time $t$
$N_o$ is the local atom density at $t=0$ and $\Delta N$ is the decrease of N that occurred between 0 and $t$, we have

EQUATION 6

$$\frac{\partial(\Delta N)}{\partial t}=\text{Div } J_a$$

Defining the quantity $$\epsilon\equiv\frac{\Delta N}{N_o}$$

as the fractional loss of material from a region, or, another way, the "equivalent" hydrostatic strain in a region, and substituting into Equation 6, we have

EQUATION 7

$$N_o\frac{\partial\epsilon}{\partial t}=\text{Div } J_a$$

Integrating, we obtain

EQUATION 8

$$N_o\epsilon=\int_0^t\text{Div } J_a dt=t\,\overline{\text{Div } J_a}$$

where:

$\overline{\text{Div } J_a}$ is the mean atom flux divergence in the time $t$ $\epsilon$ is the fractional decrease of atom density occurring in the time $t$ $N_o$ is the initial atom density (atoms/cm.$^3$)

Solving for the time $t$ in Equation 8, we obtain

EQUATION 9

$$t=\frac{N_o\epsilon}{\text{Div } J_a}$$

which states that for a given material loss locally, say 10% (i.e. $\epsilon=0.1$), the time required goes inversely as the mean atom flux divergence. It can be seen that in the case of zero mean divergence, infinite time would be required.

Failure may now be defined as the critical material loss $\epsilon=\epsilon_f$ necessary to cause an open in the conductor, and time to failure $t_f$, or in other words the lifetime, is:

EQUATION 10

$$t_f=\frac{N_o\epsilon_f}{\text{Div } J_a}$$

The critical material loss $\epsilon_f$ necessary to cause an open circuit will vary from one conductor to the next according to the way in which the material is removed from the conductor. This would be a function of the local arrangements of metallugical features such as grain boundaries, precipitate particles, etc. Further, the critical material loss $\epsilon_f$ would also be expected to depend upon conductor geometry; a conductor whose cross-sectional area is large relative to the areas of metallurgical features would have a larger $\epsilon_f$ than one whose cross-sectional area is smaller relative to these metallurgical features. Therefore, process variations that result in variations of conductor geometry would yield conductors which at comparable locations, have different values of $\epsilon_f$.

Figure 8:
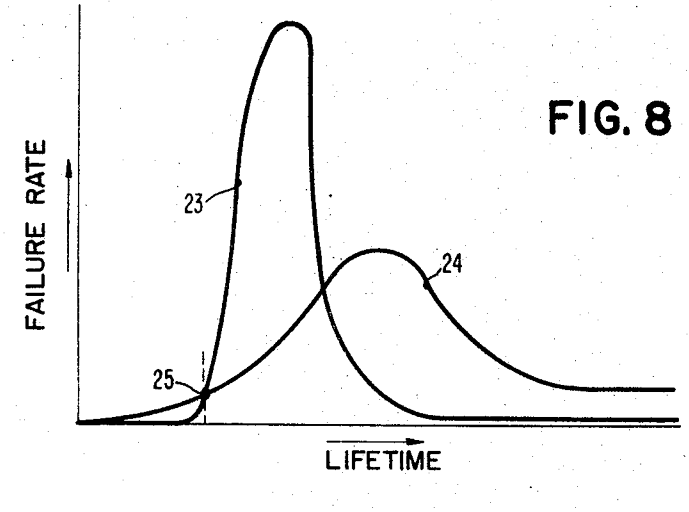
FIG. 8 is a graph showing statistical distributions of lifetimes at two comparable points along the lengths of a large sample of nominally identical conductors.

It will be apparent to one skilled in the art that since the $\epsilon_f$ values at comparable locations in a large number of manufactured conductors form a statistical distribution, it follows that the lifetime $t_f$ are also statistically distributed. Thus, with reference to FIG. 8, the failure times $t_f$ of a large sample population of nominally identical conductors form a probability density function for each point along the conductor; locations 23 and 24 refer to the probability density functions for two such points. The vertical coordinate of this probability density function is the number, or fraction, of samples that fail in an increment $dt_f$ of time, and therefore represents a failure rate. The horizontal coordinate is the time-to-failure, or lifetime, $t_f$. In general, the failure rate is not constant with respect to time, as shown in FIG. 8, and the lifetime should be conservatively assigned a value in the portion of the distribution with a low slope before the peak. Location 23 of FIG. 8 represents a narrow distribution of lifetimes such that during the early times of a period of service the failure rate is determined, not by distribution 23, but by the relatively broad distribution 24. At time 25 in FIG. 8 the failure rate due to distribution 23 becomes equal to that due to distribution 24, and then becomes suddenly much greater than that due to distribution 24 as time 25 is exceeded.

Thus, prior to time 25, failures occur mainly at one set of homologous points along the lengths of a population of conductors at a relatively low failure rate, whereas shortly after time 25 the failure rate becomes catastrophically greater, and the failures occur at another set of homologous points along the conductors.

Equation 10 enables one to predict the time 25 at which the failure rate suddenly increases, and to design a conductor in which the time 25 occurs beyond the required service lifetime of the conductor. Further, knowing the degree of process variability in conductor manufacture, in accordance with this invention, Equation 10 makes it possible to predict all points of the various failure time distributions, and to design a conductor so as to have acceptable failure rate curves.

In view of the many variables influencing the practice of the invention, an example design technique will now be set forth.

As an operational procedure in designing a conductor, in accordance with this invention, one assumes a geometrically perfect conductor and, taking into account all the constraints of geometry and physical properties, calculates the lifetime $t_f$ for each or any point along the conductor. Then knowing the quality and degree of variability resulting from the manufacturing processes, one calculates, or uses accelerated test results to construct, the variance of $t_f$ for each or any point along the conductor, and hence the probability density functions. Having the probability density functions is equivalent, as previously stated, to having the failure rate as a function of time. The decision as to whether the lifetime and failure rate will be satisfactory in service will be governed by its relationship to to the use expected from the equipment of which it is to become a part.

In following the foregoing conductor design procedure, it will be necessary to establish the divergence of the atom flux. Three possible unique conditions as sources of atom flux divergence will now be discussed.

(i) Divergence of atom flux due to a diffusion barrier

With reference to FIG. 6A, a metallic conductor 17 is joined to a contact metal or alloy 16 with electrons flowing in the direction indicated by the arrow. The atom flux away from the contact metal or alloy 16 in the conductor 17 would be proportional to the appropriate diffusion coefficient in the conductor. Similarly, the atom flux toward the conductor 17 in the contact metal or alloy 16 would be proportional to the appropriate diffusion coefficient in the contact material 16. Therefore, the atom flux divergence Div $J_a$ across the sharp or diffuse interface separating the two regions 16 and 17 would be given by

EQUATION 11

$$\text{Div } J_a=\frac{J_{17}-J_{16}}{\Delta x}$$

where:

$J_{16}$ and $J_{17}$ are the atom fluxes in conductors 16 and 17, respectively and $\Delta X$ is the distance over which the atom flux changes from $J_{16}$ to $J_{17}$ Since by Equations 2 and 3 both $J_{16}$ and $J_{17}$ are proportional to the current density $J_e$, and the quantity $1/T \exp[-\Delta H/kT]$ where $\Delta H$ is the activation energy appropriate to each material there results

EQUATION 12

$$\text{Div } J_a=\frac{NQ\rho}{k\Delta x} J_e \frac{1}{T} \exp[-\Delta H/kT]$$

where $\Delta H$ is the activation of the material 17.

Equation 12 is valid if the atom flux in material 16 is negligible relative to the atom flux in material 17 as would surely be the case if the activation energy for diffusion in material 16 were larger than that in material 17.

Therefore, by Equations 2 and 10, the lifetime $t_f$ at such a location would be given by

EQUATION 13

$$t_f \alpha \frac{k}{NQ\rho} J_e^{-1} \exp[\Delta H/kT]$$

which says on the one hand that the lifetime $t_f$ increases linearly as the first power of the reciprocal of the current density, and, on the other hand, the lifetime $t_f$ has a temperature dependence given by the factor $kT/NQ\rho \exp [\Delta H/kT]$. It will be apparent to one skilled in the art that this information is useful in devising accelerated tests and that one skilled in the art can thus predict the lifetime under service conditions from the results of physical tests accelerated both with respect to current density and temperature. This ability to calculate an accurate acceleration factor provides a partially empirical, partially theoretical, means of insuring that conductors will have acceptable reliability features. The accelerated test results, transposed to service conditions of temperature and current density using Equation 12, provide a service lifetime $t_f$. Knowing the current density and temperature dependence from Equation 12 provides the criteria for deciding upon a different conductor metal or alloy, or perhaps upon lower current density using the same metal or alloy systems in the next iteration design. As previously mentioned, the process criteria, in accordance with the invention, once established are useful for identical production.

(ii) Divergence of atom flux due to inhomogeneous microstructure

Figure 6C:
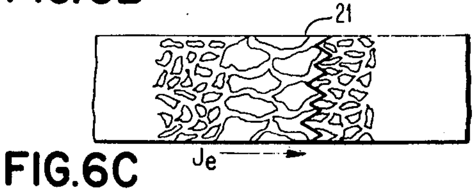

With reference to FIG. 6C, the metal or metal alloy conductor has a nonhomogeneous microstructure. The example depicted shows the conductor to have regions of large grain size interspersed with regions of fine grain size. Separating these various regions are sharp or diffuse interfaces such as the interface 21. Letting the electron flux during current passage be in the direction of the arrow in FIG. 6C, an effect takes place at interface 21 if the current-induced mass transport occurs by preferential grain boundary diffusion. Assuming the grain boundaries to have an average thickness $\delta$ normal to themselves, and, assuming that the fine grained region traces a total grain boundary line length $L_1$ on interface 21, then the effective diffusion coefficient for this fine grain region would be $L_1\delta D/A$ where $D=D_0 \exp [-\Delta H/kT]$ is the appropriate grain boundary diffusion coefficient, and A is the area of interface 21.

Therefore, using Equation 2, the atom flux $J_a'$ away from interface 21 in the fine grained region would be

EQUATION 14

$$J_a'=\frac{NQ\rho L_1\delta D_0}{kTA} J_e \exp[-\Delta H/kT]$$

Similarly, the atom flux $J_a''$ in the coarse grained region would be

EQUATION 15

$$J_a''=\frac{NQ\rho L_2\delta D_0}{kTA} J_e \exp[-\Delta H/kT]$$

where in this case $L_2$ is the total grain boundary line length traced by the coarse grained region on interface 21. Thus, the atom flux divergence in the region of interface 21 would be

EQUATION 16

$$\text{Div } J_a=\frac{J_a'-J_a''}{\Delta x}=\frac{NQ\rho}{\Delta x}\frac{1}{kT} \exp[-\Delta H/kT]$$

where $\Delta x$ is distance over which the grain size changes from coarse grained to fine grained.

Substituting Equation 16 into Equation 10, it is seen that the lifetime $t_f$ is given by

EQUATION 17

$$t_f \alpha \frac{k}{NQ\rho} T \exp[\Delta H/kT]$$

Comparison of Equation 17 with Equation 13 shows them to be identical inform, differing only by the proportionality coefficient. Thus, Case i for diffusion barrier existing at the interface between two dissimilar conducting segments, and Case ii for inhomogeneous microstructure exhibit the same functional dependence upon current density and temperature. The following observation may be made. The acceleration factors used to multiply the lifetimes that are observed in accelerated life tests in order to project the lifetimes under service conditions would be the same in each case, hence criteria for accelerated tests may be established.

A conductor which fails by virtue of the atom flux divergence resulting from inhomogeneous microstructure, can be designed to have satisfactory reliability qualities using the partially empirical, partially analytic, procedure outlined in (i) for the case of a diffusion barrier. In other words, the process variable coefficients are established by tests.

Further, knowing the factors that affect the atom flux when the atom transport occurs by preferential grain boundary diffusion, there is thus provided criteria for choosing a means of altering the effective diffusion coefficient D. For example, to reduce the effective diffusion coefficient when the atoms are transported along preferential paths such as grain boundaries, the following elections may be made:

(1) alter the grain size through appropriate alloy additions or subtractions,
(2) alter the grain size through appropirate heat treatment cycles,
(3) alter the grain boundary diffusion coefficient by causing alloy constituents either to absorb or precipitate in the grain boundaries by making the proper alloy additions or subtractions and by using appropriate heat treatments, and
(4) select a different conductor base metal having the desirable diffusion parameters in accordance with requirements of compatibility with other physical properties such as conductivity, adhesion, ability to make ohmic contact to semiconductor elements, mechanical strength etc.

The above description sets forth in detail the establishment of the atom flux divergence occurring at the discontinuity between regions of different grain size, and to the procedure for designing a conductor accordingly. It will be apparent to one skilled in the art in the light of the above teaching that the techniques set forth also apply to divergences resulting from discontinuities between regions (1) of differing stress states,
(2) having different densities of line and point defects such as dislocation lines, and vacancy-impurity atom complexes, and
(3) having different free surface diffusion coefficients, or internal surface diffusion coefficients, such as polygon or lineage walls, or the interfaces between the conductor and a substrate material.

(iii) Atom flux divergence resulting from temperature gradients

A third source of atom divergence results when the electrons move into a region of the conductor which is relatively hot, from a region which is relatively cold. In this temperature gradient the current-induced atom flux into any given small volume of conductor material from the cold region is less than that out of the small volume into the hot region. This is so because the electrons, upon colliding with the conductor atoms or ions, can cause greater atom or ion motion in the hot region than in the cold region since atom or ion mobility increases with increasing temperature. Specifically, the diffusion coefficient $D=D_0 \exp [-\Delta H/kT]$ which is a measure of atom or ion mobility, increases exponentially with increasing temperature. Thus, if in a conducting metal or alloy the electron stream is directed from a relatively cold region of the conductor to a relatively hot region, a divergence of atom flux results.

For descriptive purposes as well as for mathematical simplicity, the following derivation of the current density and temperature dependence of the atom flux divergence in the case of current-induced mass transport in a temperature gradient will be for the one dimensional case:

The one dimensional divergence of the atom flux is derived by differentiating the atom flux given by Equation 2 with respect to $x$.

EQUATION 18

$$\text{Div } J_a = \frac{\partial J_a}{\partial x} = G J_e \frac{\partial T}{\partial x} \exp\left[-\Delta H/kT\right]$$

where:

$$G = \frac{D_o}{k}\left[\frac{Q\rho}{T}\frac{\partial N}{\partial T} + \frac{N\rho}{T}\frac{\partial Q}{\partial T} + \frac{NQ}{T}\frac{\partial \rho}{\partial T} - \frac{NQ\rho}{T^2} + \frac{NQ\rho\Delta H}{kT^3}\right]$$

Of the five terms that comprise the quantity G in Equation 18, one of them dominates the other in the practical temperature range T<200° C. The dominant term is the last one, namely $NQ\rho\Delta HD_o/k^2T^3$. Thus for practical purposes in this temperature range

EQUATION 19

$$\text{Div } J_a \cong \frac{NQ\rho\Delta HD_o}{k^2T^3} J_e \frac{\partial T}{\partial x} \exp\left[-\Delta H/kT\right]$$

Substituting Equation 19 into Equation 10 there is obtained

EQUATION 20

$$\frac{\partial \epsilon}{\partial t} \cong \frac{(1-\epsilon)Q\rho\Delta HD_o}{k^2T^3} J_e \frac{\partial T}{\partial x} \exp\left[-\Delta H/kT\right]$$

Thus, in accordance with this invention, the rate at which the atom density in any local region decreases varies directly with the temperature gradient and directly with the temperature dependent quantity $$Q\rho T^{-3} \exp\left[-\Delta H/kT\right]$$

If there were no temperature variation along the stripe, there would be no local material loss, and the lifetime $t_f$ would be infinite providing there were no other causes of atom flux divergence.

The temperature T and the temperature gradient $\partial T/\partial x$ will now be established.

The rate $\partial T/\partial t$ at which the temperature of a conductor changes locally is determined by the rate at which heat enters, or is formed in, the local region minus the rate at which heat leaves, or is annihilated in, the local region. As an example, the differential heat balance equation describing the process in a conductor lying on a planar semiconductor device chip is

EQUATION 21

$$C_v \frac{\partial T}{\partial t} = K \frac{\partial^2 T}{\partial x^2} - J_e \sigma \frac{\partial T}{\partial x} - \frac{h}{d}(T - T_a) + J_e^2 \rho_d [1 + \alpha(T - T_a)]$$

where:

$C_v$=specific heat per unit volume of conductor
K=thermal conductivity
$J_e$=current density
$\sigma$=Thomson Coefficient
$h$=local heat losses from conductor through semiconductor chip to ambient heat sink
$d$=thickness of conductor
$\rho_a$=resistivity at ambient temperature
$T_a$=ambient temperature
$\alpha$=thermal coefficient of resistivity The first term in the right hand member of Equation 21 represents the rate at which heat diffuses along the conductor into a given region due to temperature gradients along the conductor; it represents the divergence of heat flux along the conductor due to divergence of temperature gradient.

The second term in the right hand member of Equation 21 represents the Thomson Effect, or the rate at which heat is created or annihilated locally in the conductor due to the superposition of both a heat flux and an electron flux along the conductor. Whether heat is created or annihilated is determined by the signs of both the temperature gradient $\partial T/\partial x$ and the empirical Thomson Coefficient $\sigma$.

The third term in the right hand member of Equation 21 represents the heat losses from the conductor to the ambient heat sink through whatever thermal resistance paths exist in the semiconductor chip and other package materials. Although these local heat losses are assumed, according to Newton's Law of Cooling, to be proportional to the difference between the local conductor temperature and the ambient temperature, the analysis is not restricted to this assumption. Any appropriate law of cooling can be used in place of the one chosen here for convenience. Notwithstanding, the assumption of Newton's Law of Cooling is, for the vast number of conductor environments and usages, not only the most tractable mathematically, but the one best describing the heat losses.

The last term in the right hand member of Equation 21 is the well known form for the local joule heating.

The lifetime $t_f$ may be established by solving Equations 20 and 21 simultaneously, and substituting $\epsilon_f$ as the critical fractional material loss necessary to cause failure by open circuit. Therefore, in accordance with this invention, there is set forth a procedure to establish the criteria for fabrication of a conductor having any arbitrary finite lifetime. In practice, as a first iteration, a conductor material is selected having particular values of $\Delta$H, $\rho$, K, $\alpha$, $\sigma$, Q, N and $C_v$. The geometric constraints $h$, $d$, $J_e$, are then specified and, finally, the ambient temperature $T_a$. Substituting these quantities into Equations 20 and 21 and solving the equations simultaneously, the time $t$ to realize a particular local material loss, or "strain," $\epsilon$ at all points $x$ along the conductor is obtained. Therefore, assigning $\epsilon_f$ into the result, the lifetime $t_f$ is obtained as a function of distance $x$ along the conductor. The lifetime $t_f$ of the conductor would be the smallest lifetime value along the length of the conductor. The critical fractional material loss, or critical "strain," $\epsilon_f$, necessary to cause the conductor to crack can either be established from the theory of elasticity and plasticity, or determined empirically.

Having established the lifetime, the value is compared with the needed lifetime for the desired use. If the lifetime is too short, the conductor is redesigned accordingly, using either a different conductor material having a higher $\Delta$H and other more favorable physical properties, or made geometrically different, that is, having different geometric and environmental constraints as are reflected by the quantities $h$, $d$, $J_e$, and $T_a$. In other words, the width, thickness, conductor material and grain size are altered as discussed.

Another method of designing a conductor, particularly useful in practice, is partially theoretical and partially empirical. A first iteration conductor is designed and then the devices using the conductor are subjected to accelerated tests, that is, conditions of high current and high ambient temperature. Knowing the form of the temperature and current density dependence of the lifetime $t_f$ from Equations 20 and 21, the liftime $t_f$ is established for real service conditions. A second iteration design based upon this first result permits more effective choice of a different conductor material having different values of $\Delta$H, $\rho$, $\alpha$, etc. and/or altering the geometric and environmental constraints, $h$, $d$, $J_e$ and $T_a$, since the functional dependence of lifetime upon these quantities is provided by Equations 20 and 21.

In choosing a conductor material, which is to say, either an entirely new material or the same base material altered by alloy additions or subtractions, or altered by heat treatment and microstructure, one skilled in the art will be aware of the necessity for compatibility with other device requirements.

In the case of semiconductor device circuits, as an example, the need for good ohmic contact between the conductor material and the semiconductor material, the need for good adhesion between the conductor and the various substrate materials, and the need for structural compatibility between the conductor material and the other glass, metal, semiconductor, organic materials that comprise the total package all affect the choice of the conductor material. This invention thus provides a means of defining the design latitude for conductors having a given base material. This latitude is defined by the sensitivity of the base metal physical parameters $\Delta H$, $\rho$, $\alpha$, etc. to alloy additions and subtractions, to heat treatment, and to other mechanical and chemical treatments.

Equations 20 and 21 were, for purposes of illustration, chosen to be for the one dimensional case in which parameters vary only in the $x$-direction. This was done to permit understanding of the parameters so that one skilled in the art may translate them into a practical structure. Thus, the analysis and hence the invention describing the process of designing a current carrying member is not limited to the one dimensional case; with relatively little additional complexity, in the light of this illustration, the treatment may be expanded to include variations of all parameters in all three principal physical dimensions.

The functional dependence of the lifetime $t_f$ determined by simultaneous solution of Equations 20 and 21 must be viewed in the light of the fact that both equations are differential equations. However, if it is assumed that $\epsilon_f$ is less than say 0.1, as has been determined empirically, very nearly the correct functional dependence of the lifetime $t_f$ on the current density and temperature can be obtained by using Equation 10. For $\epsilon_f$ 0.1 the mean atom flux divergence during the lifetime $t_f$ is very nearly the instantaneous divergence given by Equation 19. Further, since current-induced mass transport depends upon rates of mass diffusion that are much less than the rates of heat transfer, the lifetime $t_f$ of the conductor is, in general, much greater than the time needed for the structure to come to thermal equilibrium. Therefore, the temperature T and the temperature gradient $\partial T/\partial x$ of Equation 20 are for practical purposes the steady-state solutions to Equation 21, where $$\frac{\partial T}{\partial t}=0$$

Equation 21 can be solved in all cases by iterative methods, and, in certain idealized cases, analytically. Although Equation 21 represents the simple case in which only an $x$-component of current density and temperature gradient exists, the analysis is not restricted to this case; $y$- and $z$-components can just as well be included for completeness.

Figure 9A:
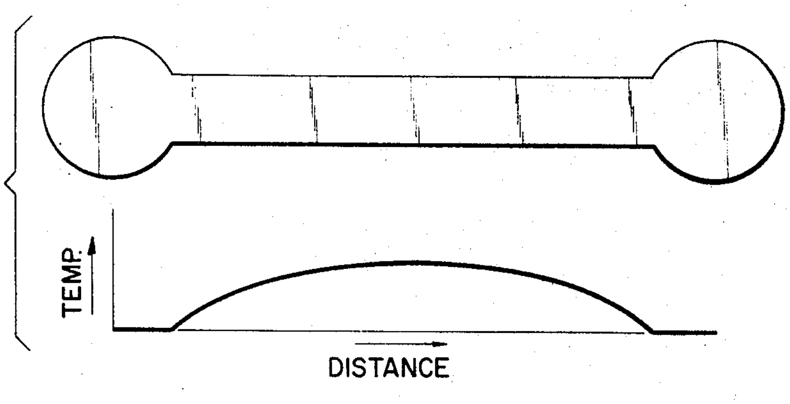
FIGS. 9A and 9B are graphs which further illustrate the relationship of thermal gradient and geometry.
Figure 9B:
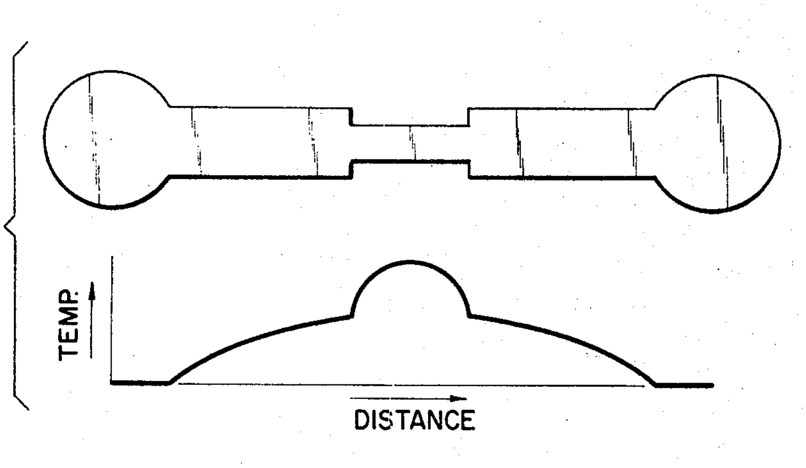

With reference to FIGS. 9A and 9B, two sample steady-state solutions to Equation 21 are shown schematically—one for a simple uniform conductor whose terminals are constrained to be at the ambient temperature $T_a$, and the other for a constricted conductor whose terminals are also at the temperature $T_a$. It can be seen that for the simple conductor in FIG. 9A the maximum temperature gradient exists at the terminals. However, for the constricted conductor in FIG. 9B, it can be seen that the maximum temperature gradient can be located at the constriction and not necessarily at the terminals. Therefore, depending upon the shape and other constraints of the device, the region of maximum temperature gradient can occur at virtually any point along the conductor.

For illustrative purposes, the analytic solution to Equation 21 for the steady-state case where $$\frac{\partial T}{\partial t}=0$$

where the Thomson Coefficient $\sigma=0$, and where the conductor terminals are held at $T=T_a$ is now written:

EQUATION 22a $$T=T_0\left[1-\frac{\sin h\,[\sqrt{\nu}(L-x)]+\sin h\,[\sqrt{\nu}x]}{\sin h\,[\sqrt{\nu}L]}\right]+T_a$$

EQUATION 22b $$\frac{\partial T}{\partial x}=\frac{T_0\sqrt{\nu}}{\sin h\,[\sqrt{\nu}L]}\,[\cos h\,[\sqrt{\nu}(L-x)]-\cos h\,[\sqrt{\nu}x]]$$

$$T_0=\frac{J_e^2\rho_a}{K\nu}$$

$$\nu=\frac{1}{K}\left(\frac{h}{d}-J_e^2\rho_a\alpha\right)$$

L-conductor length and where the distance $x$ is measured from one terminal. The correctness of solutions 22a and 22b can be verified by direct substitution into Equation 21.

It is possible to define a critical current density $J_c$.

EQUATION 23

$$J_c=\sqrt{\frac{h}{d\rho_a\alpha}}$$

L-conductor length at which the quantity $\nu$ in Equations 22a and 22b becomes zero.

As the current density $J_e$ approaches this critical current density $J_c$, the temperature of the conductor very rapidly approaches high values in most physical applications and for most mathematical boundary conditions, and the conductor melts unstably.

Substituting typical values of $h=100$ watts cm.$^{-2}$ deg.$^{-1}$, $d=10^{-4}$ cm., $\rho_a=2.5\times10^{-6}$ ohm cm. and $\alpha=4\times10^{-3}$ deg.$^{-1}$, the critical current density $J_c$ is seen to be $10^7$ amp cm.$^{-2}$, which is a factor of 10 to 100 greater than current densities used in heavy duty semiconductor device conductors. Nonetheless, if an initially uniform conductor becomes thinner, or otherwise decreases in cross-sectional area due to the phenomenon of current-induced mass transport during service, the temperature of the conductor increases, first slowly and then very rapidly, as the current density approaches approximately .25 $J_c$. Beyond this level of current density, the conductor will fail in a time that is, neglecting very specialized applications, far too short to be useful.

Examination of Equations 22a and 22b reveals that if $J_e<.25J_c$, the local temperature and the local temperature gradient of the conductor vary as the second power of the current density, holding the conductor thickness constant. If $J_e$ exceeds .25 $J_c$, the local temperature and temperature gradient increase at a rate that rapidly becomes far in excess of the second power dependence.

Further, examination of Equation 22a reveals that for $J_e<.25J_c$ the local temperature increases approximately as the first power of the reciprocal of the conductor thickness, holding current constant. As the thickness $d$ decreases such that $J_e$ exceeds approximately .25 $J_c$, then the local temperature increases at a rate that rapidly becomes far in excess of the first power dependence upon the reciprocal of the conductor thickness $d$.

Finally, examination of Equation 22b reveals that for $J_e<.25J_c$ the local temperature gradient increases in magnitude approximately as the three halves power of the reciprocal of the conductor thickness $d$, holding current constant. Decreasing the conductor thickness $d$ such that $J_e$ exceeds approximately .25 $J_c$, the magnitude of the local temperature gradient increases at a rate that rapidly becomes far in excess of the three halves power dependence upon the reciprocal of the conductor thickness $d$.

Summarizing these results, at low current densities ($J_e<.25J_c$)

EQUATION 24a $$T-T_a\propto w^{-2}h^{-1}d^{-1}I^2$$

EQUATION 24b $$\partial T/\partial x\propto w^{-2}h^{-1/2}d^{-3/2}I^2$$

where I=current and $w$=conductor width.

Equations 24*a* and 24*b* are almost exactly valid for the vast majority of conductor configurations and boundary conditions. The particular solutions represented by Equations 22*a* and 22*b* are merely an example of one of the many cases that can be solved analytically. There are, of course, an infinite number of conductor configurations and boundary constructions that can be solved by iterative techniques.

Thus, in accordance with this invention, the lifetime $t_f$ of a conductor at any point is given by substituting Equations 24*a* and 24*b* into Equation 20 and then substituting Equation 20 into Equation 10 since, for $\epsilon_f < 0.1$, the mean atom flux divergence is approximately equal to the instantaneous atom flux divergence. Since also for the practical case where $J_e < .25 J_c$, the difference between the local conductor temperature T and the temperature of the terminals $T_a$ is small, it follows that $T \cong T_a$.

These substitutions obtain

EQUATION 25

$$t_f \alpha \frac{E_f K^2}{O \rho \Delta H D_o} W^3 d^{5/2} h^{1/2} I^{-3} T_a^3 \exp[\Delta H/kT_a]$$

In accordance with this invention then, the lifetime $t_f$ of a conductor in which the process of current-induced mass transport is occurring, and in which there exists a temperature gradient along the conductor, is proportional to the third power of the reciprocal of the applied current I, the third power of the width *w* of the conductor, the five halves power of the thickness of *d* of the conductor, the one half power of the heat transfer coefficient *h*, and the temperature dependent quantity $$Q^{-1} \rho^{-1} T_a^3 \exp[\Delta h/kT]$$

Figure 10A:
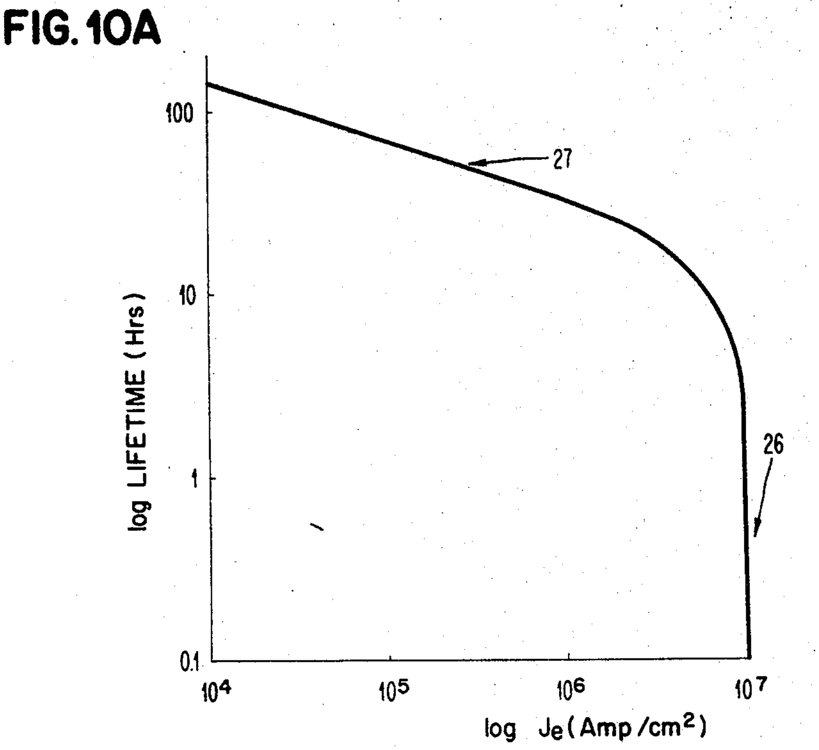
FIG. 10A is a graph giving the dependence of conductor lifetime $t_f$ in a thermal gradient as a function of current density $J_e$, and the relationship of lifetime to a critical current density $J_c$ denoted at region 26.
Figure 10B:
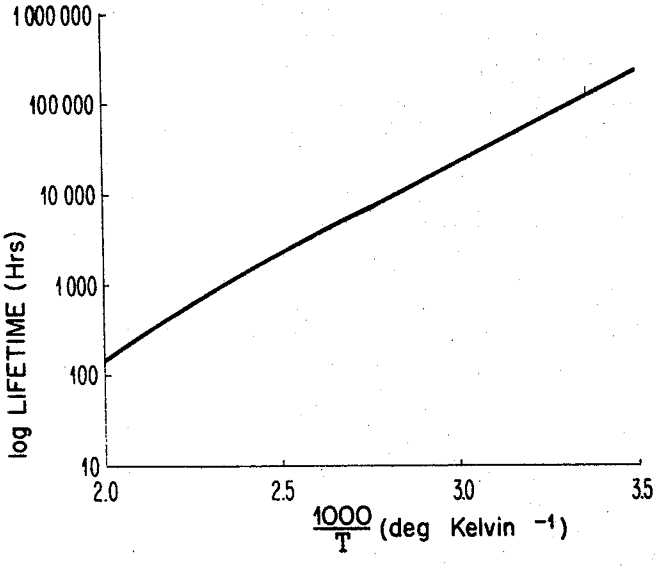
FIG. 10B is a graph giving the dependence of the conductor lifetime $t_f$ in a temperature gradient upon ambient temperature when the current density $J_e$ is held constant at a value less than 25% of a critical current density $J_c$. Although the curve appears as a straight line to a first approximation, it is not, but rather a very gently curving line.

FIG. 10A gives an example of the dependence of conductor lifetime in a temperature gradient upon current density. The linear region 27 of the graph is accurately described by Equation 25 at constant temperature. As the current density exceeds approximately 25% of the critical current density $J_c$, given by Equation 23, at location 26 on the graph, the curve becomes non-linear very rapidly as $J_c$ is approached; the form of this non-linear region between $0.25J_c$ and $J_c$, as well as the linear region itself, is given by the simultaneous solution of Equations 20 and 21. FIG. 10B is an example of the dependence of the conductor lifetime upon ambient temperature at a given current density $J_e < .25 J_c$. Although to a first approximation the graph is a straight line, it is in reality not a straight line. The slope of the line is not constant, but is itself a function of temperature; the slope, determined by differentiating Equation 25 with respect to reciprocal temperature, is $d(Int_f)/d(1/T) < \Delta H/k$. Inspection of FIG. 10B reveals that as a good approximation over a limited temperature range the dependence of conductor lifetime upon temperature at constant current can be represented as the product of a constant factor times the quantity $$\exp[\Delta H'/kT]$$

where $\Delta H'/k$ is the average slope of the curve in FIG. 10B within the limited temperature range. $\Delta H'$ will almost always be a small percentage ($\approx$0–20%) less than $\Delta H$.

Therefore, in accordance with this invention, when open circuit failure can occur by a process of current-induced mass transport in a temperature gradient, a conductor can be designed to have any finite lifetime by selecting a conductor material having the satisfactory physical properties $\Delta H$, $\rho$, K, etc. in cooperation with selecting the various geometric and environmental constraints K, *d*, *w*, and $T_a$.

Another method, in accordance with this invention, of designing a conductor having a satisfactory lifetime is a partially theoretical, partially empirical one. A first iteration conductor design is prepared. The conductor is fabricated in position on a support, substrate, package or the like. The conductor in place on the substrate, package, or the like is termed as being in situ. The conductor is tested in situ under accelerated conditions of current and temperature. Knowing the current and the temperature dependence of the lifetime, the accelerated test lifetime is projected to the current and ambient temperature anticipated in service. If this projected lifetime is not satisfactory, the device is redesigned by altering the geometric and environmental constraints *h*, *w*, *d*, and $T_a$ according to Equation 25, and/or selecting another conductor material having satisfactory physical properties $\Delta H$, $\rho$, K, etc., or modifying the same conductor material by appropriate alloy additions, subtractions, and heat treatments to have satisfactory physical properties $\Delta H$, $\rho$, K, etc. Equation 25 thus enables one skilled in the art to predict conductor lifetimes under service conditions from the results of accelerated tests. Further, Equation 25 enables one skilled in the art to modify a design to achieve a satisfactory conductor lifetime since the functional dependence of the lifetime $t_f$ on the parameters *h*, *d*, $\Delta H$, $\rho$, etc. is known. For example, changing from an aluminum-base conductor where $\Delta H \cong 0.5$ *e*V to copper where $\Delta H \cong |e$V at an ambient temperature of 350° K., all other factors held constant, would result in a factor of $10^7$ increase of lifetime $t_f$. As another example, increasing the $\Delta H$ in an aluminum-base alloy from 0.5 to merely 0.6 by appropriate alloy additions or subtractions, or by appropriate heat treatment or other processing, would result in a factor of $\approx$27 increase of lifetime $t_f$, all other factors held constant.

As yet another example, increasing the geometric parameters, *w*, *d*, and *h* each by a modest 25% results in a factor of $\approx$4 increase of lifetime $t_f$; increasing them each by 50% results in a factor of $\approx$11 increase of lifetime $t_f$.

As previously explained, there exists a practical upper limit to current density, beyond which the lifetime becomes far too short for most applications. This practical limit on current density occurs at $J_e \approx .25\ J_c$ where $J_c$ is given by Equation 23. This current density limit exists by virtue of the fact that the local temperature, in the vast majority of conductor configurations, becomes extremely high as $J_c$ is approached; the conductor melts. It is only at below approvimately .25 $J_c$ where the conductor temperature approximates the ambient temperature $T_a$, and where Equation 25 applies.

Thus, in accordance with this invention, one skilled in the art can design a conductor to have critical current $I_c$ which is sufficiently high to provide an acceptable conductor lifetime $t_f$. This is done by:

(1) increasing the heat transfer coefficient *h* by decreasing the thermal resistance between the conductor and the ambient conditions $T_a$,
(2) increasing the thickness of the conductor,
(3) selecting a conductor material that has a resistivity $\rho_a$ at ambient temperature, and a thermal coefficient of resistivity $\alpha$, such that the product $\rho_a \alpha$ is low, and finally
(4) lowering the ambient temperature $T_a$ such that $\rho_a$ is low.

What has been described is a method of handling the fabrication of large quantities of mass produced devices subject to a long duration phenomenon and to a method for fabricating an electrical conductor for use at such high current values that actual migration of the atoms takes place. Under such conditions there is an interrelationship of current and temperature, governed by conductor dimensions and material governed by the metal and its condition in situ that permits a conductor to be manufactured in accommodation of the constraints of service. The method also sets forth criteria for accelerated tests of the conductor and a method of accurately establishing long lifetimes from accelerated tests that permit devices to be built to specifications far longer than actual tests could evaluate.

What is claimed is:

1. The method of forming a current carrying member for high current densities wherein the technique of vapor deposition of the current carrying material is employed for controlling conductor lifetime comprising the steps of providing a width and height minimum cross sectional dimension combination such that the current density is confined to a value less than .25 of the maximum tolerable current density, increasing said width and height dimension combination and adjusting the self-diffusion coefficient of the particular conductor material in situ interdependently within the relationship Lifetime $\alpha$ (current density)$^{-p}$ Self-diffusion Coefficient$^{-1}$, where $p$ is between 1 and 3 and the self-diffusion coefficient including an activation energy in excess of .3 electron volts.

2. The steps in the process of claim 1 wherein said adjusting step is performed by heat cycling.

3. The process of claim 1 wherein said adjusting is performed by at least one of heat cycling and material substitution.

4. The process of fabricating an integrated semiconductor current carrying member comprising the steps of bonding a volume of current carrying conductor material having at least a combination of width and height dimensions such that the current density therethrough cannot exceed .25 of the maximum tolerable current density, and establishing the lifetime of the conductor by the relationship Lifetime $\alpha$ (current density)$^{-p}$ Self-diffusion Coefficient$^{-1}$, where $p$ is between 1 and 3 and the self-diffusion coefficient including an activation energy in excess of .3 electron volts, and interdependently varying said dimensional criteria by appropriate changes in width and height dimensions and said self-diffusion coefficient criteria by appropriate changes in either physical state or actual material until the lifetime is within the desired value.

5. The process of claim 4 wherein said physical changes in self-diffusion coefficient are made by at least one of heat cycling, grain size control and actual material substitution.

6. The process of fabricating an aluminum current carrying conductor for current values in excess of 100,000 amp/cm.$^2$ in an integrated circuit comprising the steps of vapor depositing conductor material on a substrate with a width and height combination dimension such that a current density less than 2 million amp/cm.$^2$ is maintained, and appropriately interdependently altering said current density and a self-diffusion coefficient of said vapor deposited conductor material in situ on a substrate in the relationship Lifetime $\alpha$ (current density)$^{-p}$ Self-diffusion Coefficient$^{-1}$, where $p$ is between 1 and 3 and the self-diffusion coefficient including an activation energy in excess of .3 electron volts.

7. The process of claim 6 wherein said alteration of said self-diffusion coefficient is accomplished by at least one of heat cycling and material substitution.

References Cited

UNITED STATES PATENTS 2,799,824 7/1957 Heynic et al. -------- 324—20

OTHER REFERENCES

C.A.A. Tech. Dev. Note No. 29, Laufer and Bernstein, Life Tests of Electric Discharge Lamps, May 1943, pp. 1 and 2.

JOHN F. CAMPBELL, Primary Examiner

W. T. BROOKS, Assistant Examiner

U.S. Cl. X.R.

29—593; 324—20, 158

PO-1050
(5/69)

UNITED STATES PATENT OFFICE
CERTIFICATE OF CORRECTION

Patent No. 3,474,530 Dated October 28, 1969

Inventor(s) Norman G. Ainslie, Devendra S. Chhabra, Donald W. Jepsen and Walter E. Mutter It is certified that error appears in the above-identified patent and that said Letters Patent are hereby corrected as shown below:

| | |
|---|---|
| Column 4, line 45 (In the Specification Page 8, line 25) | "appears" should read--operates-- |
| Column 11, line 34 (In the Specification Page 24, line 11) | "smaller" should read --small-- |
| Column 12, Equation 13 (In the Specification Page 27, Equation 13) | " $t_f \alpha \frac{k}{NQ\rho} J_e^{-1} \exp[\Delta H/kT]$ " should read -- $t_f \alpha \frac{k}{NQ\rho} J_e^{-1} T\exp[\Delta H/kT]$ -- |
| Column 13, line 19 (In the Specification Page 28, line 13) | after "for" insert --all-- |
| Column 13, line 69 (In the Specification Page 29, Line 25) | "inform" should read --in form-- |
| Column 14, line 22 (In the Specification Page 30, line 24) | "appropirate" should read --appropriate-- |
| Column 15, line 14 (In the Specification Page 33, line 5) | "other" should read --others-- |

PO-1050 (5/69)

UNITED STATES PATENT OFFICE

CERTIFICATE OF CORRECTION

Patent No. 3,474,530 Dated October 28, 1969

Inventor(s) Norman G. Ainslie, Devendra S. Chhabra, Donald W. Jepsen and Walter E. Mutter It is certified that error appears in the above-identified patent and that said Letters Patent are hereby corrected as shown below:

Column 18, line 10 (In the Specification Page 40, line 7) "L-conductor length" should read --L=conductor length--

Column 18, line 20 In the Specification Page 40, after line 13 delete "L-conductor length"

Column 19, Equation 25 (In the Specification Page 43, Equation 25)

"$t_f \alpha \frac{E_f K^2}{0\rho \Delta HD_o} W^3 d^{5/2} h^{1/2} I^{-3} T_a{}^3 \exp[\Delta H/kT_a]$"

should read

--$t_f \alpha \frac{\epsilon_f K^2}{Q\rho \Delta HD_o} W^3 d^{5/2} h^{1/2} I^{-3} T_a{}^3 \exp[\Delta H/kT_a]$--

Signed and sealed this 5th day of September 1972.

(SEAL)
Attest:

EDWARD M.FLETCHER,JR.
Attesting Officer

ROBERT GOTTSCHALK
Commissioner of Patents